US012791579B2

(12) United States Patent
Arai et al.

(10) Patent No.: US 12,791,579 B2
(45) Date of Patent: Nov. 10, 2026

(54) SCANNING PROBE MICROSCOPE AND NON-TRANSITORY COMPUTER READABLE MEDIUM

(71) Applicant: SHIMADZU CORPORATION, Kyoto (JP)

(72) Inventors: Hiroshi Arai, Kyoto (JP); Hideo Nakajima, Kyoto (JP); Shiho Moriguchi, Kyoto (JP); Chiharu Nakano, Fukuchiyama (JP)

(73) Assignee: SHIMADZU CORPORATION, Kyoto (JP)

(*) Notice: Subject to any disclaimer, the term of this patent is extended or adjusted under 35 U.S.C. 154(b) by 309 days.

(21) Appl. No.: 18/696,237

(22) PCT Filed: Mar. 23, 2022

(86) PCT No.: PCT/JP2022/013493
§ 371 (c)(1),
(2) Date: Mar. 27, 2024

(87) PCT Pub. No.: WO2023/053522
PCT Pub. Date: Apr. 6, 2023

(65) Prior Publication Data

US 2024/0402215 A1 Dec. 5, 2024

(30) Foreign Application Priority Data

Sep. 28, 2021 (JP) ................................ 2021-158201

(51) Int. Cl.
*G01Q 10/06* (2010.01)

(52) U.S. Cl.
CPC .................................... *G01Q 10/06* (2013.01)

(58) Field of Classification Search
CPC ...................................................... G01Q 10/06
See application file for complete search history.

(56) References Cited

U.S. PATENT DOCUMENTS

2019/0178640 A1 6/2019 Hashizume et al.

FOREIGN PATENT DOCUMENTS

| | | | |
|---|---|---|---|
| JP | 2000-275159 A | | 10/2000 |
| JP | 2005249682 A | * | 9/2005 |
| WO | 2018/042535 A1 | | 3/2018 |

OTHER PUBLICATIONS

English Translation of JP2005249682A Matsushita, et. al. from Espacenet (Year: 2005).*

PCT Written Opinion of the International Searching Authority for application No. PCT/JP2022/013493 dated Jun. 7, 2022.

* cited by examiner

*Primary Examiner* — David E Smith
*Assistant Examiner* — Laura Eloise Tandy
(74) *Attorney, Agent, or Firm* — Muir Patent Law, PLLC

(57) ABSTRACT

A scanning probe microscope divides an observation target region of a sample into a plurality of regions, and drives a scanner to scan the surface of the sample for each region. The data processing unit acquires image data corresponding to the respective regions in the plurality of regions. The input means accepts a user input regarding the acquisition conditions for the plurality of pieces of image data. The acquisition conditions include scanning conditions of the scanner. When the input means accepts a user input for any two variables out of three variable, the data processing unit is configured to calculate a remaining one of the three variables based on the accepted two variables.

7 Claims, 8 Drawing Sheets

SCANNING PROBE MICROSCOPE AND NON-TRANSITORY COMPUTER READABLE MEDIUM

TECHNICAL FIELD

The present disclosure relates to a scanning probe microscope and a non-transitory computer readable medium.

BACKGROUND ART

Japanese Unexamined Patent Application Publication No. 2000-275159 (Patent Document 1) discloses a scanning probe microscope (SPM: Scanning Probe Microscope) that has a probe at the tip of a cantilever and acquires information on the sample surface by bringing the probe close to the sample. This scanning probe microscope generates image data based on the acquired information and displays the observation image of the sample surface based on the image data.

PRIOR ART DOCUMENT

Patent Document

Patent Document 1: Japanese Unexamined Patent Application Publication No. 2000-275159

SUMMARY OF THE INVENTION

Problems to be Solved by the Invention

In the case where the observation target region on the sample surface is wider than the observation field of view (scanning range) of the scanning probe microscope, the observation target region is divided into a plurality of regions, and the surface profile is observed for each region. In this case, it is necessary to set a scanning range of the sample surface for each image data in order to acquire a plurality of pieces of image data corresponding to the plurality of regions, respectively. Specifically, in order to arrange a plurality of scanning ranges side by side within an observation target region, the user is required to perform the tasks of positioning each scanning range and setting the amount of movement required for the sample stage, on which the sample is placed, to transition from one scanning range to another. According to this, it is concerned that as the number of image data to be acquired increases, the workload on the user increases.

The purpose of the present disclosure is to solve such problems. The purpose of the present disclosure is to reduce the workload of the user in a scanning probe microscope that acquires a plurality of pieces of image data indicating the surface profile of the observation target region by scanning within the observation target region of a sample.

Means for Solving the Problems

A scanning probe microscope according to one aspect of the present disclosure is provided with:

- a probe configured to be arranged to face a surface of a sample;
- a scanner configured to move a relative position between the sample and the probe;
- a drive unit configured to drive the scanner to scan the surface of the sample for each of a plurality of regions acquired by dividing an observation target region of the sample into the plurality of regions;
- a data processing unit configured to acquire a plurality of pieces of image data corresponding to the plurality of regions, respectively, as observation images of the observation target region; and
- an input means configured to accept a user input regarding a condition for acquiring the plurality of pieces of image data.

The data processing unit is configured to set the condition based on the user input.

The condition includes a scanning condition of the scanner.

When the input means accepts the user input for any two variables out of three variables consisting of a scanning range of the scanner for each image data, a spacing between two adjacent scanning ranges, and a maximum number of fields of view capable of being obtained from a maximum scanning range of the scanner, the data processing unit is configured to calculate a remaining one of the three variables based on the accepted two variables.

Effects of the Invention

According to the present disclosure, it is possible to reduce the workload of the user in a scanning probe microscope that acquires a plurality of pieces of image data showing the surface profile of the observation target region by scanning within the observation target region of a sample.

EMBODIMENTS FOR CARRYING OUT THE INVENTION

Hereinafter, some embodiments of the present disclosure will be described with reference to the attached drawings.

Note that the same or equivalent part in the figures is assigned by the same reference symbol, and the description thereof will not be repeated.

[Configuration of Scanning Probe Microscope]

Figure 1:
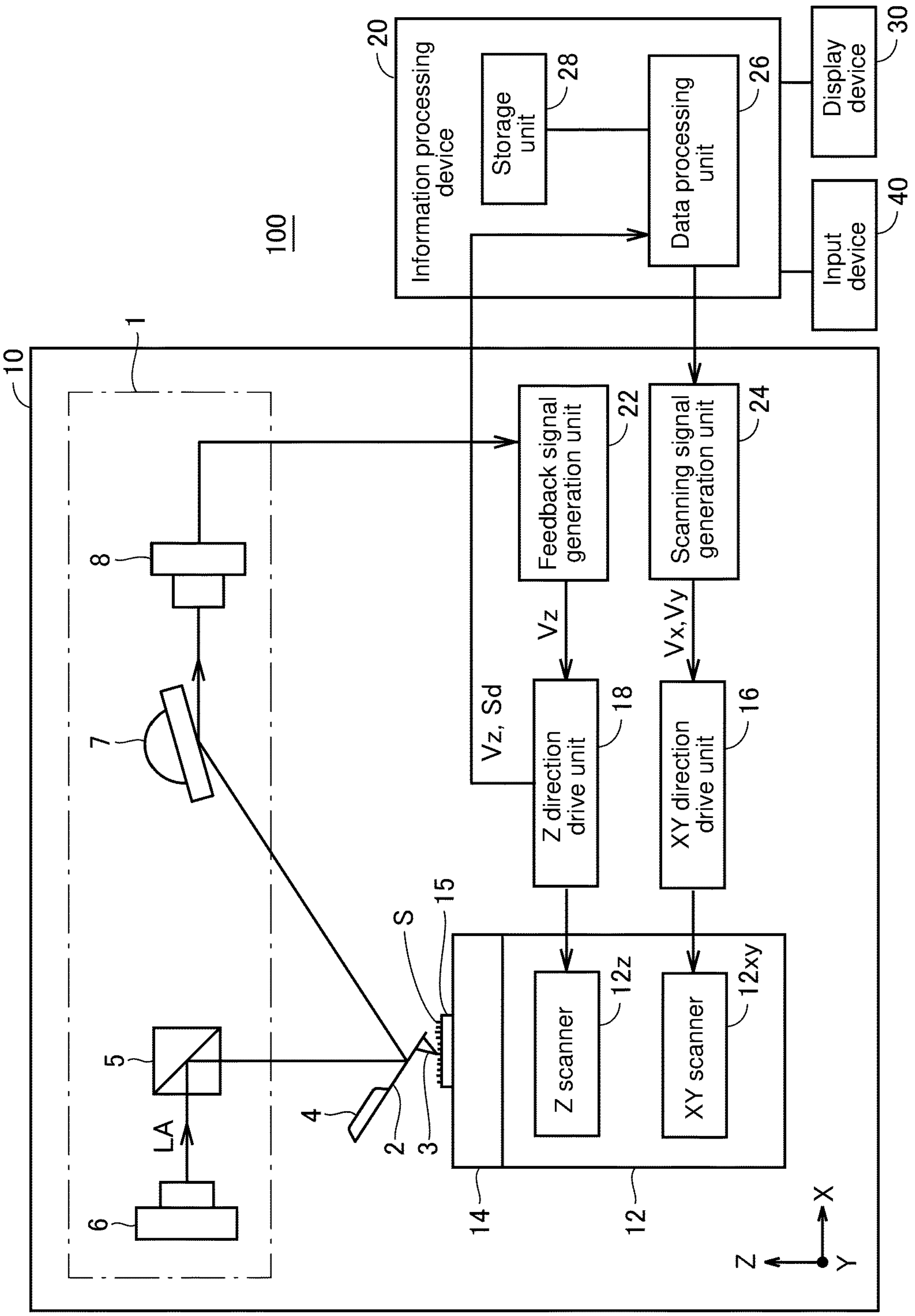
FIG. 1 is a diagram schematically showing a configuration of a scanning probe microscope according to an embodiment.

FIG. 1 is a diagram schematically showing a configuration of a scanning probe microscope (SPM: Scanning Prove Microscope) according to an embodiment. The scanning probe microscope 100 according to this embodiment is typically an atomic force microscope (AFM: Atomic Force Microscope) that uses the interatomic force (attraction or repulsion) between the probe 3 and the surface of the sample S to observe the profile of the surface of the sample S. The present disclosure can be similarly applied to other scanning probe microscopes, such as a scanning tunneling microscope (STM: Scanning Tunneling Microscope).

Referring to FIG. 1, the sample S is fixed to the surface of a hard and flat substrate 15. In this embodiment, the sample S is assumed to be a powder sample consisting of fine particles. The sample S may be any sample that contains powder, for example, and it may also be a liquid sample containing powder. The substrate 15 is made of a material, such as glass, mica, and silicon wafers. This scanning probe microscope 100 according to this embodiment can be used for particle analysis of powder samples.

The scanning probe microscope 100 is equipped with, as its principal constituent elements, an observation device 10, an information processing device 20, a display device 30, and an input device 40. The observation device 10 is equipped with, as its main constituent elements, an optical system 1, a cantilever 2, a scanner 12, a sample holder 14, an XY direction drive unit 16, a Z direction drive unit 18, a feedback signal generation unit 22, and a scanning signal generation unit 24.

The scanner 12 is cylindrical in shape and serves as a moving device to change the relative position between the sample S and the probe 3. The substrate 15 on which the sample S is placed is held by the sample holder 14 on the scanner 12. The scanner 12 is equipped with an XY scanner 12*xy* that moves the sample S in two mutually orthogonal X- and Y-axis directions within a plane parallel to the top surface of the sample holder 14, and a Z scanner 12*z* that finely moves the sample S in the Z-axis direction, orthogonal to both the X- and Y-axis directions. The XY scanner 12*xy* has a piezoelectric element that is deformed by the voltage applied from the XY direction drive unit 16.

The Z scanner 12*z* is equipped with a piezoelectric element that is deformed by the voltage applied from the Z direction drive unit 18. The XY scanner 12*xy* and the Z scanner 12*z* are not limited to a piezoelectric element.

The cantilever 2 is formed as a leaf spring, with one end being supported by the holder 4. The other end of the cantilever 2 is a free end and is positioned above the sample S in the Z-axis direction. The cantilever 2 has a surface facing the sample S and a back surface on the opposite side. A probe 3 is positioned on the surface at the tip of the free end of the cantilever 2 to face the sample S. The back surface of the tip portion has a reflective surface designed to reflect light. The tip of the cantilever 2 is displaced in the Z-axis direction by the interatomic force acting between the probe 3 and the sample S.

Above the cantilever 2 in the Z-axis direction, the optical system 1 is provided to detect the deflection amount (i.e., the displacement of the tip) of the cantilever 2. The optical system 1 irradiates the back surface (reflective surface) of the cantilever 2 with laser light during the observation of the sample S and detects the laser light reflected by this reflective surface. Specifically, the optical system 1 is composed of a laser light source 6, a beam splitter 5, a reflective mirror 7, and a photodetector 8.

The laser light source 6 has a laser oscillator that emits a laser beam. The photodetector 8 has a photodiode that detects the incident laser light. The laser beam LA emitted from the laser light source 6 is reflected by the beam splitter 5 and directed onto the back surface (reflective surface) of the cantilever 2. The laser light reflected by the back surface of the cantilever 2 is further reflected by the reflective mirror 7 and enters the photodetector 8.

The photodetector 8 has light-receiving surfaces divided into a plurality (usually two) of sections in the Z-axis direction (displacement direction) of the cantilever 2. Alternatively, the photodetector 8 has a light-receiving surface divided into four sections both in the Z-axis direction and the Y-axis direction. When the tip of the cantilever 2 is displaced in the Z-axis direction, the ratio of the light amounts irradiated onto the plurality of light-receiving surfaces changes, and therefore, the deflection amount (displacement amount) of the cantilever 2 can be detected based on the plurality of light-receiving amounts.

The feedback signal generation unit 22 calculates the deflection amount of the cantilever 2 by performing arithmetic processing on the detection signal received from the photodetector 8. The feedback signal generation unit 22 controls the Z direction position of the sample S so that the interatomic force between the probe 3 and the sample S is always constant. Specifically, the feedback signal generation unit 22 calculates the deviation Sd between the calculated deflection amount of the cantilever 2 and the target value, and calculates the control amount necessary to drive the Z scanner 12*z* so that the deviation Sd becomes zero. The feedback signal generation unit 22 calculates a voltage value Vz to displace the Z scanner 12*z* in response to this control amount. The feedback signal generation unit 22 outputs a signal indicating the voltage value Vz to the Z direction drive unit 18. The Z direction drive unit 18 applies the voltage value Vz to the Z scanner 12*z*.

The scanning signal generation unit 24 calculates the voltage value Vx in the X-axis direction and the voltage value Vy in the Y-axis direction so that the sample S moves in the X-axis direction and the Y-axis direction relative to the probe 3 according to the preset scanning condition. The scanning signal generation unit 24 outputs signals indicating the calculated voltage values Vx and Vy to the XY direction drive unit 16. The XY direction drive unit 16 applies the voltage values Vx and Vy to the XY scanner 12*xy*. Note that the scanning conditions include information on the scanning range (i.e., observation field of view) in the XY plane, the scanning direction, and the scanning speed. The details of the scanning conditions will be described later.

The information processing device 20 primarily controls the operation of the observation device 10 and is equipped with a data processing unit 26 and a storage unit 28.

The signal indicating the feedback amount (the applied voltage Vz to the Z scanner 12*z* and the deviation Sd) in the Z-axis direction is sent from the Z-axis direction drive unit 18 to the data processing unit 26 and is stored in the storage unit 28. The data processing unit 26 calculates the displacement of the sample S in the Z-axis direction from the voltage Vz, based on the correlation information indicating the relation between the voltage Vz and the corresponding displacement of the sample S in the Z-axis direction, which is previously stored in the storage unit 28. The calculated displacement reflects the value (hereinafter also referred to as "Z-value") that indicates the position of the sample S in the Z-axis direction. The data processing unit 26 calculates the displacement of the sample S in the Z-axis direction at each position in the X- and Y-axis directions within the scanning range, to generate three-dimensional image data representing the surface profile of the sample S.

This image data contains a value (Z-value) indicating the position in the Z-axis direction at each position on the XY plane. Note that the Z value corresponds to the height of the surface at each position on the substrate 15, and corresponds to the height including the sample S at the position where the sample S is present. The data processing unit 26 displays the generated image data on the display device 30 and stores it in the storage unit 28.

[Hardware Configuration of Information Processing Device]

Figure 2:
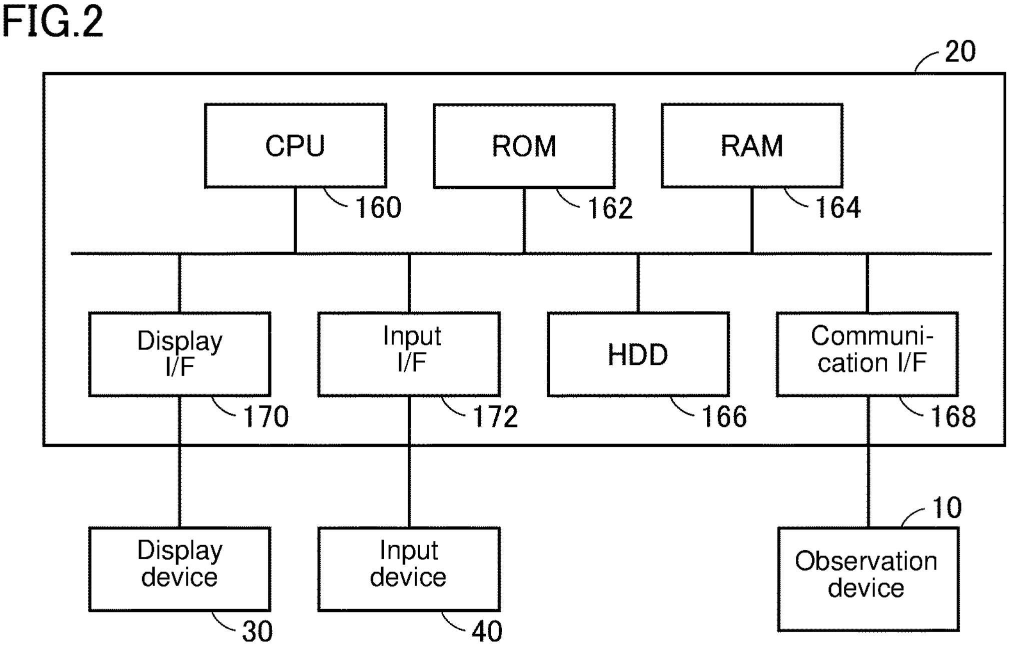
FIG. 2 is a diagram showing one example of a hardware configuration of an information processing device.

FIG. 2 is a diagram showing an example of a hardware configuration of the information processing device 20. Referring to FIG. 2, the information processing device 20 includes, as its principle constituent elements, a CPU (Central Processing Unit) 160, a ROM (Read Only Memory) 162, a RAM (Random Access Memory) 164, an HDD (Hard Disk Drive) 166, a communication I/F (Interface) 168, a display I/F 170, and an input I/F 172. Each constituent element is interconnected by a data bus. Note that at least a part of the hardware configuration of the information processing device 20 may be provided inside the observation device 10. Alternatively, the information processing device 20 may be configured as a unit separate from the scanning probe microscope 100, and may be configured to communicate bidirectionally with the scanning probe microscope 100.

The communication I/F 168 is an interface for communicating with the observation device 10. The display I/F 170 is an interface for communicating with the display device 30. The input I/F 172 is an interface for communicating with the input device 40.

The ROM 162 stores programs that are to be executed by the CPU 160. The RAM 164 can temporarily store the data generated by the execution of programs in the CPU 160 as well as the data input via the communication I/F 168. The RAM 164 serves as a temporary data memory that can function as a working area. The HDD 166 is a nonvolatile storage device. In place of the HDD 166, a semiconductor storage device, such as flash memory, may be employed.

The programs stored in the ROM 162 may be stored in a storage medium and distributed as a program product. Alternatively, the programs may be provided by an information provider as downloadable product programs through the so-called Internet or other means. The information processing device 20 reads a program provided by a storage medium or the Internet. The information processing device 20 stores the read program in a predetermined memory region (e.g., ROM 162). By executing the program, the CPU 160 can perform the image data acquisition processing that will be described later.

The display device 30 can display a setting screen for setting image data acquisition conditions. Further, during the acquisition of image data, the display device 30 can display both the image data generated by the information processing device 20 and the data obtained by processing the image data.

The input device 40 accepts inputs including instructions from the user (e.g., an analyst) directed to the information processing device 20. The input device 40 includes a keyboard, a mouse, and a touch panel that is integrally configured with the display screen of the display device 30 and accepts image acquisition conditions.

[Operation of Scanning Probe Microscope]

Next, the operation of the scanning probe microscope 100 shown in FIG. 1 will be described.

In this embodiment, for the purpose of evaluating the particle size of the sample S (powder sample), it is assumed that image data, which are observation images of the surface profile of the sample S, are acquired using the scanning probe microscope 100.

Here, in the scanning probe microscope 100, the scanning range (imaging field of view) in the XY plane is limited by the movable range of the piezoelectric elements contained in the XY scanner 12*xy*. Therefore, in the case where the observation target region of the surface of the sample S is larger than the scanning range of the scanning probe microscope 100, the observation target region is divided into a plurality of regions, and the surface profile of the sample S is observed for each region. In this case, the scanning probe microscope 100 is configured to move (offset) the scanning range in the X-axis and/or Y-axis direction each time image data is acquired for one scanning range (imaging field of view) to enable the continuous observation of a plurality of regions sequentially. With this, image data corresponding to each of the plurality of regions will be generated sequentially, one by one for each region.

To automatically acquire such a plurality of pieces of image data sequentially, in the scanning probe microscope 100, conditions for acquiring a plurality of pieces of image data are initially set. The acquisition conditions for the plurality of pieces of image data include a condition related to scanning of the scanner 12, a condition related to the acquisition order of a plurality of pieces of image data, a condition related to the processing of the acquired image data, and a condition related to the display of the image data. The information processing device 20 controls the operation of the observation device 10 according to the set conditions, enabling the acquisition of a plurality of pieces of image data for the observation target region.

Figure 3:
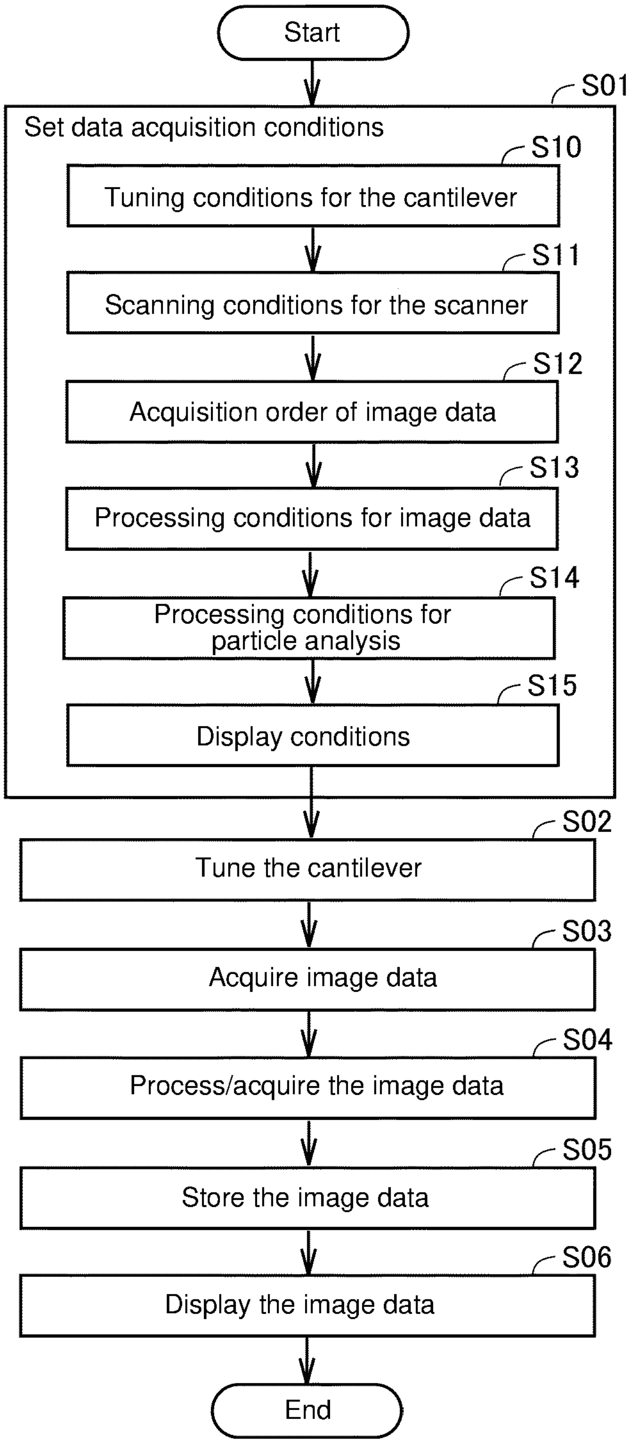
FIG. 3 is a flowchart for explaining the procedures for image data acquisition processing executed by the scanning probe microscope.

FIG. 3 is a flowchart for explaining the procedures for the acquisition processing of image data executed by the scanning probe microscope 100. As shown in FIG. 3, the image data acquisition processing includes the following steps: a step of setting the acquisition conditions for image data (S01), a step of tuning the cantilever 2 (S02), a step of acquiring the image data (S03), a step of processing and extracting the image data (S04), a step of storing the image data (S05), and a step of displaying the image data (Step S06). Hereinafter, the processing of each step will be described.

(1) Step of Setting Acquisition Conditions for Image Data (S01 in FIG. 3)

In the step of setting acquisition conditions for image data (S01 in FIG. 3), the tuning conditions for the cantilever 2 (S10), the scanning conditions for the scanner 12 (S11), the acquisition order for the image data (S12), the processing conditions for the image data (S13), the processing conditions for the particle analysis (S14), and the display conditions for the image data and data (e.g., particle size distribution data) based on the data (S15) are set. Note that the conditions set in Step S01 are not limited to them. Further, the order in which these conditions are set is not limited, and the user can set them in any order. In this embodiment, the display device 30 is configured to be able to display a setting screen for setting the acquisition conditions for image data. The user can set various conditions on the setting screen by operating the input device 40.

(1-1) Tuning Conditions of Cantilever (S10)

The tuning conditions (S10) for the cantilever 2 are conditions that are set when the operation mode of the scanning probe microscope 100 is in a dynamic mode. The tuning conditions include items, such as the type of the cantilever 2, the frequency range within which the cantilever 2 is excited, and the amplitude. The user can set each item using the input device 40.

In the dynamic mode, the cantilever 2, which is brought close to the surface of the sample S, is made to excite at a frequency near its resonance point. The amplitude of the vibrations of the cantilever 2 changes due to the interatomic force acting between the probe 3 and the surface of the sample S. The feedback signal generation unit 22 (see FIG. 1) controls the Z scanner 12*z* through feedback to finely adjust the position of the sample S in the Z-axis direction so that the amplitude of the vibration remains constant. By processing the control amount for this feedback control by the data processing unit 26, it is possible to generate the image data of the surface profile of the sample S.

(1-2) Scanning Conditions for Scanner (S11)

Figure 4:
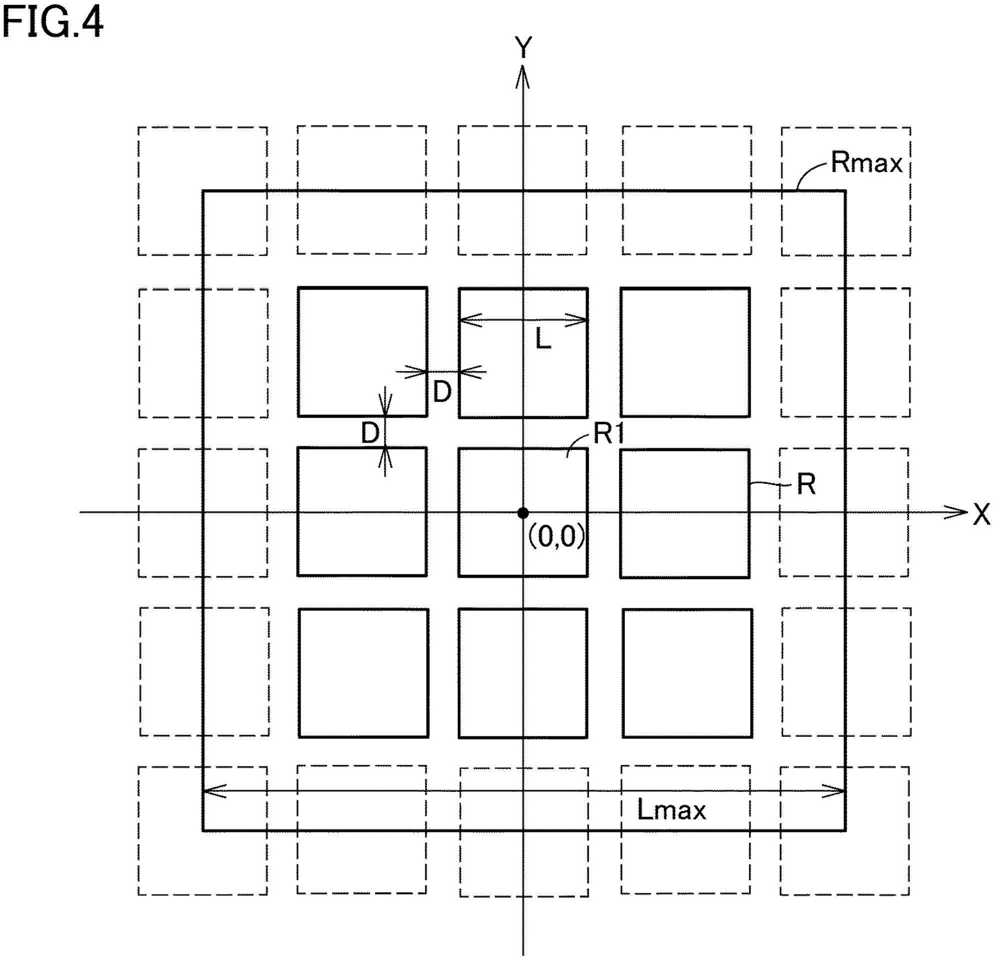
FIG. 4 is a diagram for explaining the method of setting a plurality of scanning ranges.

In setting (S11) the scanning conditions of the scanner 12, the conditions for movements of the XY scanner 12*xy* in the X-axis and Y-axis directions are set. As described above, in the case where the observation target region on the surface of the sample S is divided into a plurality of regions, a plurality of scanning ranges is set corresponding to each of the plurality of regions. FIG. 4 is a diagram for explaining the method of setting a plurality of scanning ranges.

Referring to FIG. 4, the XY scanner 12*xy* is capable of deforming in both the positive and negative directions of the X-axis, centered around X=0, as well as in both the positive and negative directions of the Y-axis, centered around Y=0. With this, it is possible to move the sample S in both the positive and negative directions of the X-axis, as well as in both the positive and negative directions of the Y-axis, centered around the origin (0, 0) of the XY plane. Note that the movement amount (deformation amount) in each of the X- and Y-axis directions can be controlled by the voltages Vx and Vy applied to the XY scanner 12*xy*. The origin (0, 0) represents the state (initial state) in which the movement amount (deformation amount) in the X-axis direction and the movement amount (deformation amount) in the Y-axis direction are both zero.

FIG. 4 shows the maximum scanning range Rmax of the XY scanner 12*xy*. The maximum scanning range Rmax is in the shape of a square, centered around the origin (0, 0). The length Lmax of one side of this square is determined by the movable range of the XY scanner 12*xy* in both the X- and Y-axis directions.

In Step S11, it is possible to set a plurality of scanning ranges R within the maximum scanning range Rmax. One scanning range R corresponds to the range in which the XY scanner 12*xy* moves the probe 3 and the sample S relative to each other to generate one piece of image data. In other words, one scanning range R corresponds to the range in which the probe 3 scans the surface of the sample S to generate one piece of image data. The scanning range R has a square shape with a side length of L.

As shown in FIG. 4, the plurality of scanning ranges R is arranged at equal spacing along the X-axis and Y-axis directions with the origin (0, 0) as the center. Specifically, one scanning range R1 out of the plurality of scanning ranges R is arranged so that its center is positioned at the origin (0, 0). And, a plurality of scanning ranges R is arranged at spacing D from each other in the X- and Y-axis directions, with this scanning range R1 as the center. In the example shown in FIG. 4, a total of nine scanning ranges R is arranged in a 3 by 3 matrix, with the scanning range R1 at the center.

By configuring such that the scanning range R1 is arranged centered on the origin (0, 0) and the plurality of scanning ranges R is arranged centered on this scanning range R1, it ensures that within the maximum scanning range Rmax, the scanning ranges R are equally arranged in the positive and negative directions of the X-axis, as well as the scanning ranges R are equally arranged in the positive and negative directions of the Y-axis. With this, it is possible to evenly observe the observation target region on the surface of the sample S through the plurality of scanning ranges R (observation fields of view)."

Note that squares that are at least partially beyond the maximum scanning range Rmax, as indicated by the dotted lines in FIG. 4, are not set as scanning ranges R. In this specification, the maximum value of the number of scanning ranges R (observation fields of view) that can be obtained from the maximum scanning range Rmax is defined as "maximum number Nmax of fields of view." In the example shown in FIG. 4, the maximum number Nmax of fields of view is 9.

As mentioned above, the maximum scanning range Rmax is a fixed value based on the movable range of the XY scanner 12*xy*, so the maximum number Nmax of fields of view depends on the length L of the scanning range R and the spacing D between adjacent scanning ranges R. In other words, the maximum number Nmax of fields of view, the length L of the scanning range R, and the spacing D between the scanning ranges R have the relation that when the value of any two of these three variables is determined, the remaining one variable is uniquely determined.

Figure 5:
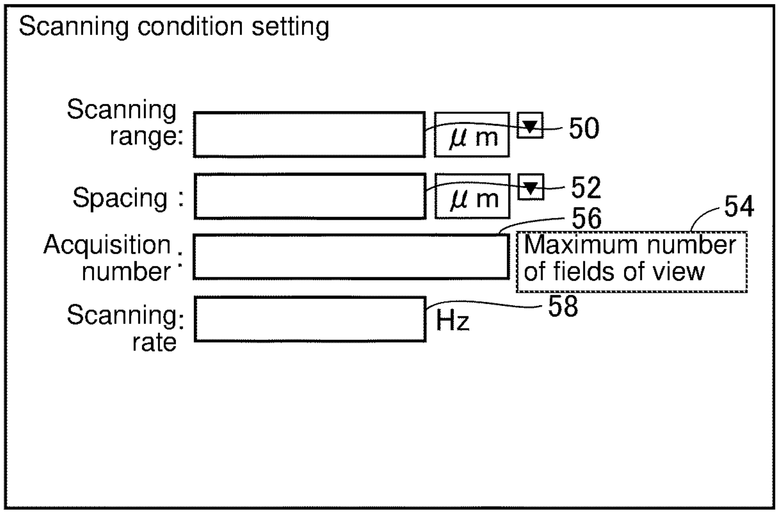
FIG. 5 is a diagram schematically showing a first example of a settings screen for setting scanning conditions for a scanner.

In Step S11, the relation between these three variables is used to simplify the user input process. Specifically, the user input process can be conducted using the setting screen for setting scanning conditions, which is displayed on the display device 30. FIG. 5 is a diagram schematically showing a first example of a settings screen for setting scanning conditions for the scanner 12.

As shown in FIG. 5, the settings screen displays a tab 50 for setting the numerical value of the scanning range R (length L), a tab 52 for setting the numerical value of the spacing D between the scanning ranges R, a tab 54 for setting the numerical value Nmax of the maximum number of fields of view, a tab 56 for setting the numerical value of the acquisition number N of image data, and a tab 58 for setting the numerical value of the scanning rate. Note that the input means for accepting the scanning condition settings by the user is not limited to tabs, but any interface (such as GUI (Graphical User Interface)) can be employed. Note that the scanning rate is the speed of one line of scanning. The scanning rate when one line is scanned back and forth within one second is 1 [Hz].

All of the tabs shown on the settings screen in FIG. 5 are configured to accept user inputs. The tabs 50 and 52 are each provided with a tab to switch the units (μm/nm) of the numerical values.

The user can enter a numerical value for each tab using the input device 40. Note that the upper and lower limits of the settable range of the length L of the scanning range R are determined by the movable range of the XY scanner 12*xy*. The upper limit of the settable range is the length Lmax of one side of the maximum scanning range Rmax. The spacing D between the scanning ranges R can be set to 0 as the lower limit. In other words, two adjacent scanning ranges R can be positioned with no spacing between them.

In the setting screen of FIG. 5, the tab 50 for the scanning range R, the tab 52 for the spacing D between scanning ranges R, and the tab 54 for the maximum number Nmax of fields of view are configured so that when the user inputs values in any two tabs, the value for the remaining one tab is automatically calculated. Such a configuration can be achieved by having the data processing unit 26 perform computation processing using the relation between the three variables described above.

Specifically, the relation shown in the following Formula (1) is established between the length Lmax of the maximum scanning range Rmax, the length L of the scanning range R, the spacing D between the scanning ranges R, and the maximum number Nmax of fields of view.

$$Lmax \geq L \times Nmax^{1/2} + D \times (Nmax^{1/2} - 1) \quad (1)$$

Since Lmax on the left side of the above Formula (1) is a fixed value, when two of the three variables L, D and Nmax on the right side are set, the remaining one variable can be calculated. By preparing in advance a relational formula or a table or the like that shows the relation shown in Formula (1) described above, the data processing unit 26 can calculate the remaining one variable using the relational formula or the table when two of the variables are input.

Figure 6:
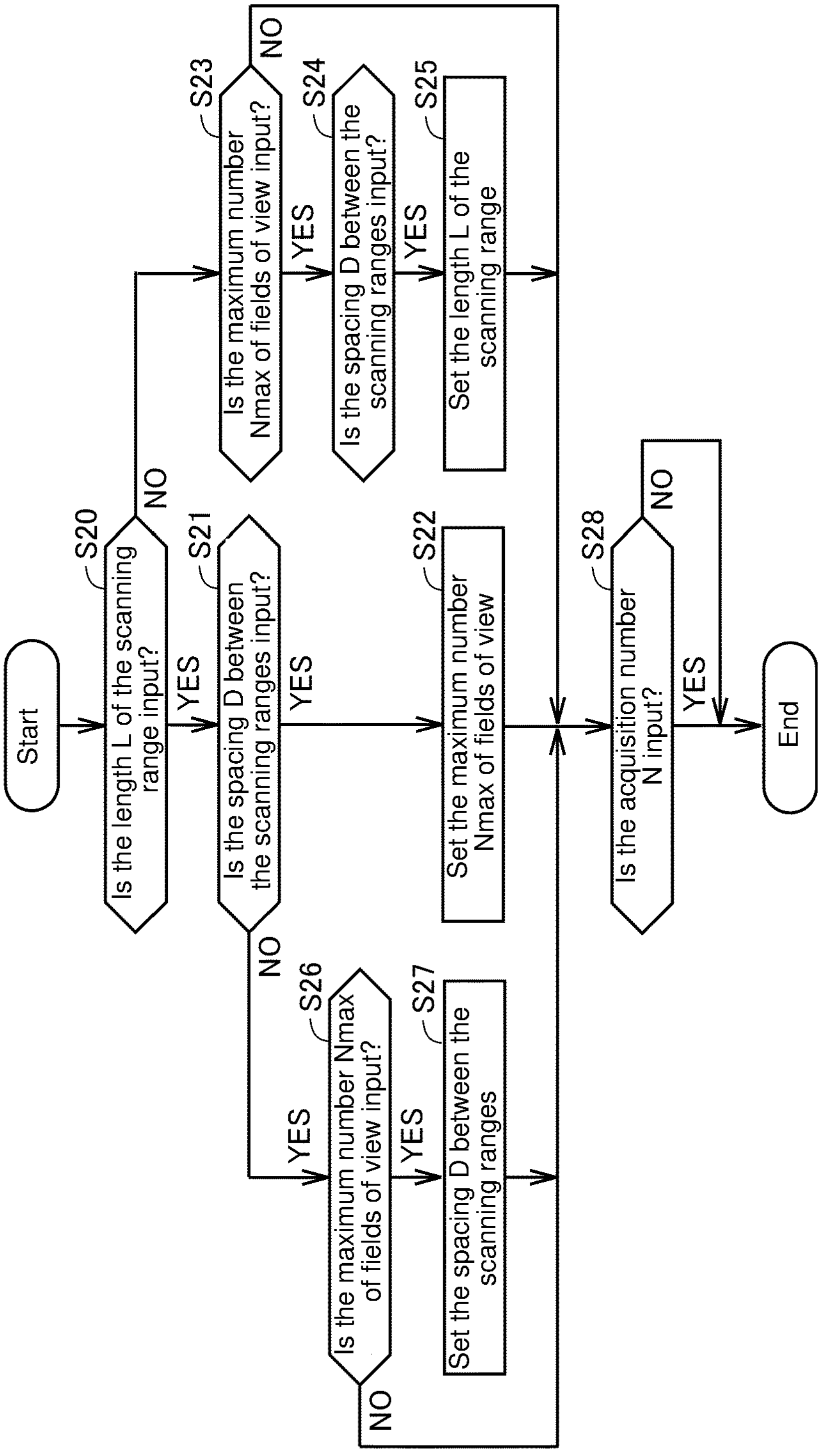
FIG. 6 is a flowchart for explaining the processing steps for setting scanning conditions for the scanner.

FIG. 6 is a flowchart for explaining the processing procedure for setting scanning conditions (S11 in FIG. 3) for the scanner 12. The flowchart shown in FIG. 6 is executed by the data processing unit 26 of the information processing device 20.

Referring to FIG. 6, in Step S20, the data processing unit 26 determines whether the length L of the scanning range R has been input on the tab 50 of the scanning condition setting screen shown in FIG. 5. The determination in Step S20 and Steps S21, S23, S24, and S26 described below can be made based on the user input transmitted from the input device 40 to the input I/F 172.

When the length L of the scanning range R is input on the tab 50 (YES in S20), the data processing unit 26 then determines in Step S21 whether the spacing D between the scanning ranges R is input on the tab 52 of the setting screen. When the spacing D between the scanning ranges R is input on the tab 52 (YES in S21), the data processing unit 26 calculates the maximum number Nmax of fields of view in Step S22 based on the preset maximum scanning range Rmax and the length L of the scanning range R and the spacing D between the scanning ranges R input in Steps S20 and S21. The maximum number Nmax of fields of view can be calculated by using a relational formula or a table based on the relation in Formula (1) described above. The data processing unit 26 displays the value of the calculated maximum number Nmax of fields of view on the tab 54 of the setting screen.

On the other hand, when the length L of the scanning range R is not entered on the tab 50 in Step S20 (NO in S20), the data processing unit 26 determines whether the maximum number Nmax of fields of view is entered on the tab 54 of the setting screen in Step S23.

When the maximum number Nmax of fields of view is entered on the tab 54 (YES in S23), the data processing unit 26 then determines, in Step S24, whether the spacing D between the scanning ranges R is entered on the tab 52 of the setting screen. When the spacing D between the scanning ranges R is entered on the tab 52 (YES in S24), in Step S25, the data processing unit 26 calculates the length L of the scanning range R, based on the preset maximum scanning range Rmax, the maximum number Nmax of fields of view entered in Steps S23 and S24, and the spacing D between the scanning ranges R. The length L of the scanning range R can be calculated by using a relational formula or a table based on the relation of Formula (1) described above. The data processing unit 26 displays the value of the calculated length L of the scanning range R on the tab 50 of the setting screen.

When the spacing D between the scanning ranges R is not entered on the tab 52 in Step S21 (NO in S21), the data processing unit 26 determines whether the value of the maximum number Nmax of fields of view is entered on the tab 54 of the setting screen in Step S26.

When the maximum number Nmax of fields of view is input on the tab 54 (YES in S26), in Step S27, the data processing unit 26 calculates the spacing between the scanning ranges R based on the preset maximum scanning range Rmax and the length L of the scanning range R and the maximum number Nmax of fields of view input in Steps S20 and S26. The spacing D between the scanning ranges R can be calculated by using a relational formula or a table based on the relation of Formula (1) described above. The data processing unit 26 displays the value of the calculated spacing D between the scanning ranges R on the tab 52 of the setting screen.

When the maximum number Nmax of fields of view, the length L of the scanning range R, and the spacing D between the scanning ranges R are set in Steps S20 to S27, the data processing unit 26 proceeds to Step S28 to determine whether the acquired number N of the image data is entered on the tab 56 of the setting screen. The acquired number N of the image data can be set within the range from 1 to Nmax. When the acquired number N is entered on the tab 56 (YES in S28), the data processing unit 26 terminates processing.

Note that the processing for setting scanning conditions is not limited to those shown in the setting screen shown in FIG. 5 and the flowchart shown in FIG. 6. For example, as the scanning condition, conditions related to the feedback control executed by the feedback signal generation unit 22 and the number of pixels in the image data can be set.

(First Modification)

Figure 7:
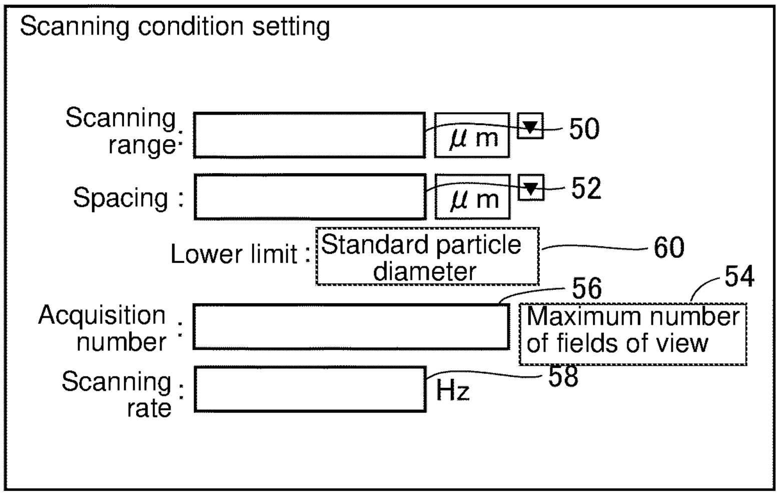
FIG. 7 is a diagram schematically showing a second example of a settings screen for setting scanning conditions for the scanner.

FIG. 7 is a diagram schematically showing a second example of a setting screen for setting the scanning screen of the scanner 12. The settings screen shown in FIG. 7 is a settings screen shown in FIG. 5 with a tab 60 added.

A lower limit within the settable range of the spacing D between the scanning ranges R is entered in advance on the tab 60. The lower limit of this spacing D is set to the standard particle size of the powder sample that will be the sample S. The standard particle size of the powder sample can be set based on the known particle size distribution of the powder sample. For example, the standard particle size can be set to the average particle size in a known particle size distribution. Alternatively, the standard particle size can be set to a target value for the particle size, which is set based on a known particle size distribution.

Here, when the spacing D between the scanning ranges R is smaller than the standard particle size of the powder sample, there can occur a case in which particles positioned on the spacing D straddle two adjacent scanning ranges R with the spacing D between them. In this case, the particle will be observed in duplicate across the two scanning ranges R. As a result, when counting the number of particles present in each observation field of view, counting one particle twice (so-called 'double counting') across two scanning ranges R could potentially reduce the accuracy of the particle count value.

In the first modification, by setting the lower limit of the spacing D between the scanning ranges R to the standard particle size of the sample S, it is possible to set the spacing D between the scanning ranges R to a value greater than or equal to the standard particle size. With this, a particle positioned on the spacing D will be present in only one of the two scanning ranges R adjacent to the spacing D, or in none of the two scanning ranges R. This prevents a single particle from being present across the two scanning ranges R. Therefore, it is possible to avoid the double-counting described above.

(Second Modification)

Figure 8:
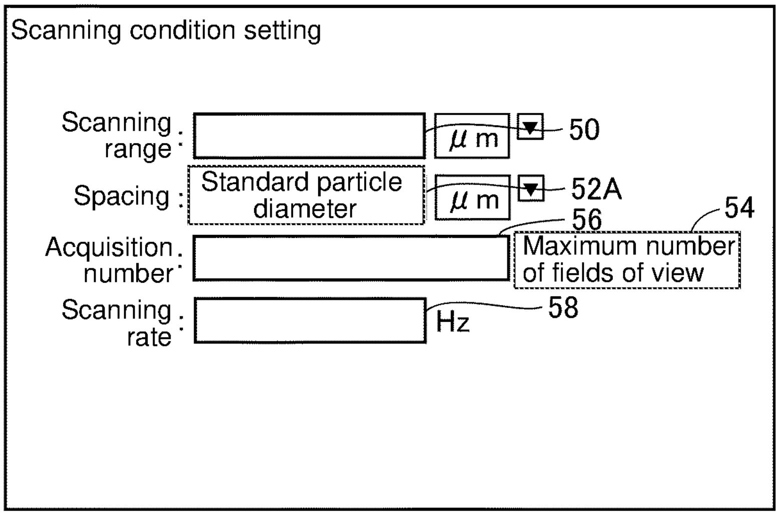
FIG. 8 is a diagram schematically showing a third example of a settings screen for setting scanning conditions for the scanner.

FIG. 8 is a diagram schematically showing a third example of a setting screen for setting the scanning screen of the scanner 12. The settings screen shown in FIG. 8 is a settings screen shown in FIG. 5 with the tab 52 replaced with a tab 52A.

On the tab 52A, the spacing D between the scanning ranges R is set in advance to a predetermined value that is greater than or equal to the standard particle size of the sample S. In the example in FIG. 8, the spacing D is set to the standard particle size of the sample S. It is sufficient that the spacing D is greater than or equal to the standard particle size of the sample S. For example, it may be a value obtained by adding a predetermined value to the standard particle size, or by multiplying the standard particle size by a predetermined value.

In this modification example, by registering the standard particle size for each type of powder sample to be used as the sample S in advance, the standard particle size of the sample S can be configured to be automatically entered on the tab 52A when the setting screen shown in FIG. 8 is displayed on the display device 30.

Since the numerical value for the tab 52A has been set in advance on the configuration screen in FIG. 8, the user can enter numerical values for the remaining tabs 50, 54, and 56 using the input device 40. At this time, for the tab 50 for the scanning range R and the tab 54 for the maximum number Nmax of fields of view, the system is configured so that when the user inputs a numerical value on one of the tabs, the numerical value on the remaining one is automatically calculated.

Such a configuration can be achieved by the information processing device 20 performing arithmetic processing using the relation between the three variables described above. Specifically, since Lmax and D are fixed values in the relation shown in Formula (1) described below, when one of the two variables, L and Nmax, is set, the data processing unit 26 can calculate the remaining one variable.

Figure 9:
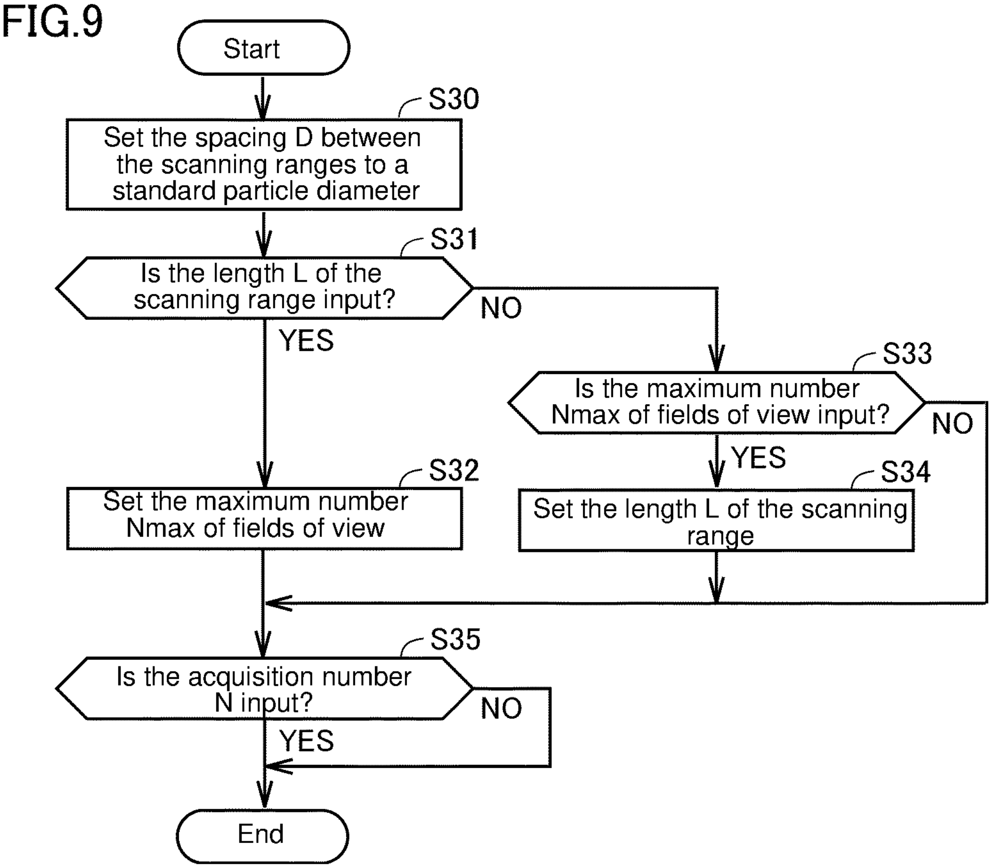
FIG. 9 is a flowchart for explaining the processing steps for setting scanning conditions for the scanner.

FIG. 9 is a flowchart for explaining the processing procedure for setting scanning conditions (S11 in FIG. 3) for the scanner 12. The flowchart shown in FIG. 9 is executed by the data processing unit 26 of the information processing device 20.

Referring to FIG. 9, in Step S30, the data processing unit 26 sets the spacing D between the scanning ranges R on the tab 52A of the scanning condition setting screen shown in FIG. 8 to a predetermined value (e.g., the standard particle size) greater than or equal to the standard particle size of the powder sample of the sample S.

Next, the data processing unit 26 determines whether the length L of the scanning range R is input on the tab 50 of the setup screen in Step S31. The determination in Step S31 and Steps S33 described below can be made based on the user input transmitted from the input device 40 to the input I/F 172.

When the length L of the scanning range R is input on the tab 50 (YES in S31), the data processing unit 26 calculates in Step S32 the maximum number Nmax of fields of view based on the preset maximum scanning range Rmax, the spacing between the scanning ranges R set in Step S30, and the length L of the scanning range R input in Step S21. The maximum number Nmax of fields of view, can be calculated by using a relational formula or a table based on the relation in Formula (1) described above. The data processing unit 26 displays the value of the calculated maximum number Nmax of fields of view on tab 54 of the setting screen.

On the other hand, when the length L of the scanning range R is not entered on the tab 50 in Step S31 (NO in S31), the data processing unit 26 determines whether the maximum number Nmax of fields of view is entered on the tab 54 of the setting screen in Step S33.

When the maximum number Nmax of fields of view is input on the tab 54 (YES in S33), in Step S34, the data processing unit 26 calculates the length L of the scanning range R, based on the preset maximum scanning range Rmax, the spacing D between the scanning ranges R set in Step S30, and the maximum number Nmax of fields of view input in Step S33. The length L of the scanning range R can be calculated by using a relational formula or a table based on the relation of Formula (1) described above. The data processing unit 26 displays the value of the calculated length L of the scanning range R on the tab 50 of the setting screen.

When the maximum number Nmax of fields of view, the length L of the scanning range R, and the spacing D between the scanning ranges R are set in Steps S30 to S34, the data processing unit 26 proceeds to Step S35 to determine whether the acquisition number N of the image data is entered on the tab 56 of the setting screen. When the acquisition number N is input on the tab 56 (YES in S35), the data processing unit 26 terminates the processing.

Note that the processing for setting scanning conditions is not limited to those shown in the setting screen shown in FIG. 8 and the flowchart shown in FIG. 9. For example, as the scanning condition, conditions related to the feedback control executed by the feedback signal generation unit 22 and the number of pixels in the image data can be set.

As described above, in the second modification, since the spacing D between two adjacent scanning ranges R has been set in advance to a value greater than or equal to the standard particle size of the sample S, it is sufficient for the user to input a value for either the length L of the scanning range R or the maximum number Nmax of fields of view. With this, the user input process can be simplified. Further, the spacing D between the scanning ranges R is set to a value greater than or equal to the standard particle size of the sample S, and therefore, the double-counting problem described above can be avoided.

(1-3) Acquisition Order of Image Data (S12 in FIG. 3)

In the step (S12 in FIG. 3) of setting the acquisition order of image data, the order of acquiring image data for the acquisition number N set in Step S11 is set.

Figure 10:
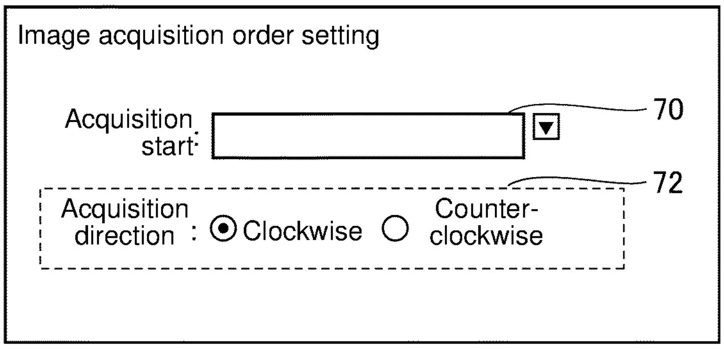
FIG. 10 is a diagram schematically showing an example of a settings screen for setting the acquisition order of image data.

FIG. 10 is a diagram schematically showing an example of a settings screen for setting the acquisition order of image data. The setting screen shown in FIG. 10 can be displayed on the display device 30.

As shown in FIG. 10, the settings screen displays a tab 70 for specifying the first image data to be acquired when image data acquisition is started and a tab 72 for setting the image data acquisition direction.

Figure 11:
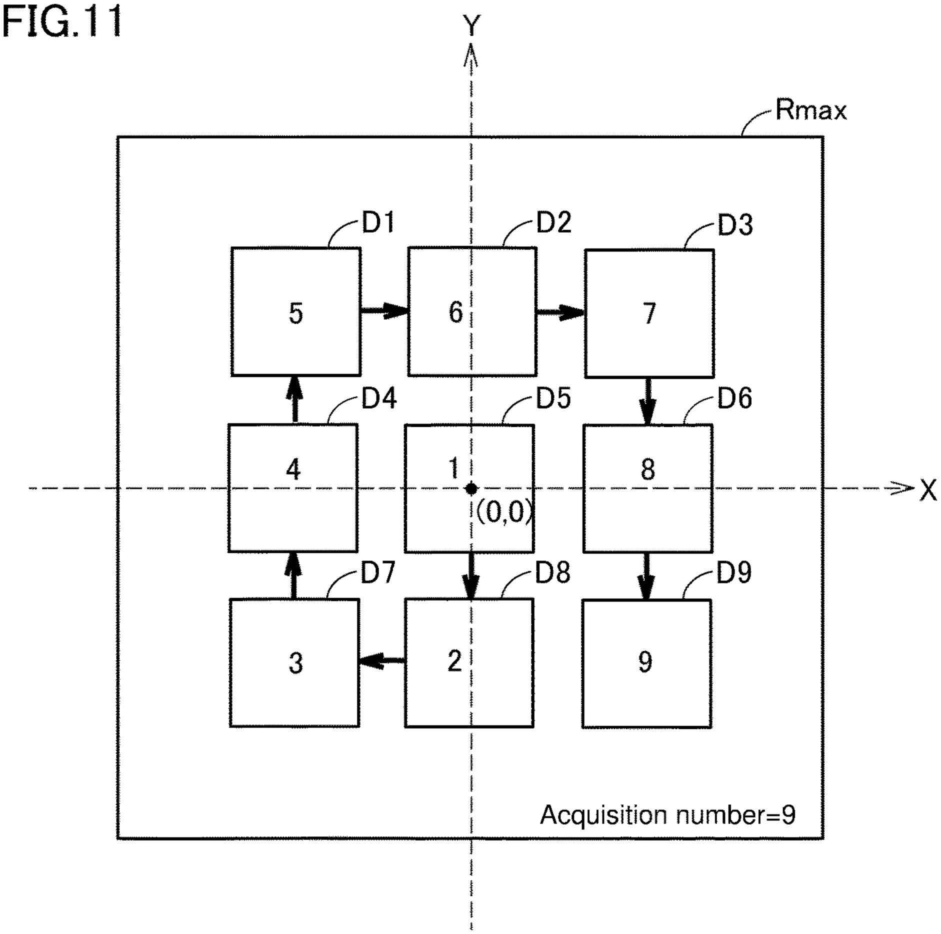
FIG. 11 is a diagram for explaining the acquisition order of image data.

FIG. 11 is a diagram for explaining the acquisition order of image data. FIG. 11 shows the acquisition order of image data when the acquisition number of the image data is N=9. When the acquisition number N is 9 (N=9), nine pieces of image data D1 to D9 will be acquired, corresponding to nine scanning ranges arranged according to the length L of the scanning range R and the spacing D between the scanning ranges R set in Step S11.

The user can specify the first image data to be acquired out of the nine pieces of image data D1 to D9 on the setting screen shown in FIG. 10. In the example shown in FIG. 11, it is assumed that the image data D5 positioned on the origin (0, 0) of the XY plane is designated as the first image data.

When the first image data D5 is specified by the user, the data processing unit 26 sets the acquisition order for the remaining eight pieces of image data. Specifically, the data processing unit 26 sets the acquisition order so that the moving distance of the XY scanner 12*xy* to acquire the nine pieces of image data D1 to D9 is minimized. In the example shown in FIG. 11, the acquisition order is set so that image data is acquired clockwise in the order of D5, D8, D7, D4, D1, D2, D2, D3, D6, and D9.

When the step of acquiring image data (S03 in FIG. 3) described below is initiated, the scanning signal generation unit 24 of the information processing device 20 moves the scanning range R of the XY scanner 12*xy* according to the acquisition order that has been set. Specifically, when one piece of image data is acquired for one scanning range R, the scanning signal generation unit 24 moves the scanning range R to acquire the next image data. By alternately repeating the acquisition of image data and the movement of the scanning range R in this manner, image data is sequentially acquired one by one according to the set acquisition order.

At this time, the scanning signal generation unit 24 calculates the voltage value Vx in the X-axis direction and the voltage value Vy in the Y-axis direction using the start position of the next scanning range R as the target value, and outputs the calculated voltage values Vx and Vy to the XY direction drive unit 16. In the case of using an open-loop control for the operation of the XY scanner 12*xy* via the XY direction drive unit 16, it is possible to move the XY scanner 12*xy* more rapidly than with a feedback control, which controls the movement of the XY scanner 12*xy* by detecting its current position. On the other hand, when the movement amount of the XY scanner 12*xy* becomes large, there is a concern that there is a concern that a discrepancy between the target position and the actual position might occur. To minimize the discrepancy, it is necessary to reduce the amount of movement of the XY scanner 12*xy*.

Figure 12:
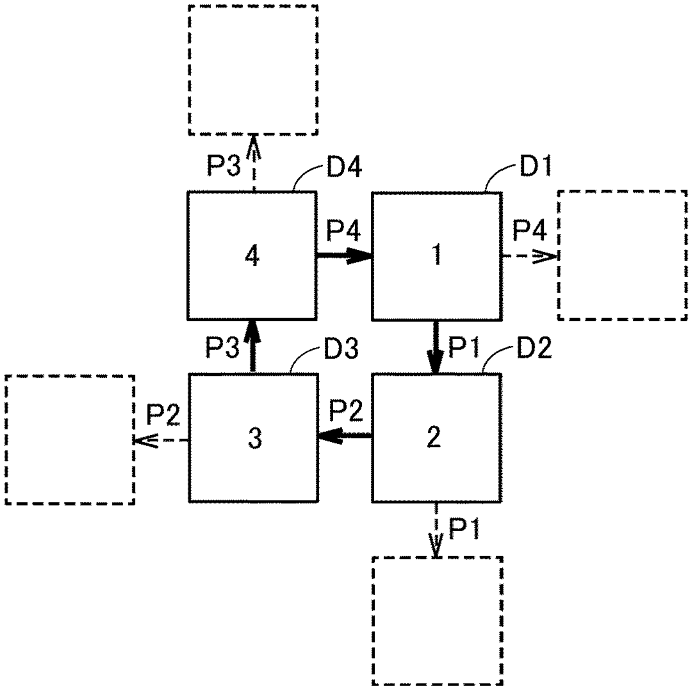
FIG. 12 is a diagram for explaining the basic concept of the acquisition order of image data.

Therefore, the information processing device 20 sets the acquisition order of N pieces of images data so that the movement distance of the XY scanner 12*xy* is minimized. FIG. 12 is a diagram for explaining the basic concept of the acquisition order of image data.

As shown in FIG. 12, when acquiring image data for one scanning range R and then acquiring the next image data, the scanning signal generation unit 24 is configured to move the XY scanner 12*xy* to a scanning range that is adjacent in either the Y-axis direction or the X-axis direction relative to that scanning range. In the example shown in FIG. 12, for the movement direction of the scanning range, P1 represents the negative Y-axis direction, P2 represents the negative X-axis direction, P3 represents the positive Y-axis direction, and P4 represents the positive X-axis direction. When the image data acquisition direction is set to be clockwise, the priority is assigned in the order of P1, P2, P3, and P4 in the movement direction of the scanning range.

Upon acquiring the first image data D1, the scanning signal generation unit 24 moves the scanning range of the XY scanner 12*xy* in the direction P1. After acquiring the second image data D2, the scanning signal generation unit 24 moves the scanning range in the direction P1. If there is no adjacent scanning range in the direction P1, as shown in FIG. 12, the scanning signal generation unit 24 moves the scanning range in the direction P2. After acquiring the third image data D3 for the scanning range after the movement, the scanning signal generation unit 24 moves the scanning range in the direction P2. If there is no adjacent scanning range in the direction P2, as shown in FIG. 12, the scanning signal generation unit 24 moves the scanning range in the direction P3. Upon acquiring the fourth image data D4, the scanning signal generation unit 24 moves the scanning range in the direction P3. If there is no adjacent scanning range in the direction P3, as shown in FIG. 12, the scanning signal generation unit 24 moves the scanning range in the direction P4. In the example shown in FIG. 12, four pieces of image data D1 to D4 are acquired in turn in the clockwise direction. Although not illustrated, when the image data acquisition direction is set counterclockwise, the priority is set in the order of P1, P4, P3, and P2 for the four movement directions P1 to P4 shown in FIG. 12.

In the setting screen shown in FIG. 10, the user can set the scanning range of the first image data to be acquired on the tab 70, which indicates the start of acquisition, and the acquisition direction (clockwise/counterclockwise) of the image data on the tab 72, which indicates the acquisition direction. Upon receiving a user input from the input device 40, the data processing unit 26 sets the acquisition order for the N pieces of image data based on the concepts described in FIG. 11 and FIG. 12.

(1-4) Processing Conditions for Image Data (S13 in FIG. 3)

Returning to FIG. 3, in the step (S13 in FIG. 3) for setting processing conditions for image data, the user can set conditions for the processing of the acquired image data. As the conditions related to the processing of image data, the user may set the type of signal to be processed. The target signals include a signal (height signal) indicating the Z value and a signal indicating the deviation Sd. In addition, as data processing contents, it is possible to set whether to perform inclination correction of image data, etc.

(1-5) Processing Conditions (S14 in FIG. 3) for Particle Analysis

In the step of setting processing conditions for particle analysis (S14 in FIG. 3), the user can set conditions related to the processing of the acquired image data. As conditions for processing image data, the user can set the range of Z values (upper limit and/or lower limit) for data to be extracted from the image data that has been subjected to image processing according to Step S13.

In the observation image shown by a single piece of image data, at the position where particles are present, the height is different from the position where no particles are present, and therefore the Z value is also different. Therefore, by appropriately setting the range of the Z value, the position where particles are present can be identified. This allows the number of particles present in the image data to be calculated. Furthermore, by executing processing to calculate the particle size of each particle based on the Z value (height) at each position of the image data, the particle size distribution data of the sample S can be generated.

(1-6) Display Conditions (S15 in FIG. 3)

In the step for setting display conditions (S15 in FIG. 3), the user can set conditions for displaying image data. In this step, it is possible to set the display method for the image data and the particle size distribution data generated by particle analysis.

(2) Step to Tune Cantilever (S02 in FIG. 3)

Once the data acquisition conditions are set in Step S01, the information processing device 20 starts acquiring image data in response to a user input instructing it to start acquiring image data. The information processing device 20 initially performs tuning of the cantilever 2 in Step S02. When the operation mode of the scanning probe microscope 100 is in a dynamic mode, the cantilever 2 is excited according to the tuning conditions set for the cantilever 2 in Step S10.

(3) Step to Acquire Image Data (S03 in FIG. 3)

In Step S03, the information processing device 20 (scanning signal generation unit 24) drives the XY scanner 12*xy* in accordance with the scanning conditions of the scanner 12 set in Step S10 and the image data acquisition order of image data set in Step S12.

The data processing unit 26 sequentially acquires N pieces of image data by creating image data for each scanning range based on the signal that indicates the Z-axis feedback amount (the applied voltage Vz to the Z scanner 12*z* and the deviation Sd) transmitted from the feedback signal generation unit 22.

(4) Step to Process and Extract Image Data (S04 in FIG. 3)

In Step S04, the information processing device 20 processes the acquired image data each time one piece of image data is acquired, according to the image data acquisition conditions set in Step S13. The information processing device 20 further extracts the data in the range of Z value set in the processing conditions for particle analysis in Step S14 from the processed image data. This allows the number of particles present in the image data to be calculated.

(5) Step to Save Image Data (S05 in FIG. 3)

In Step S05, the information processing device 20 stores the N pieces of image data that have been image processed and the data based on them in the storage unit 28 as data indicating the surface profile of the observation target region of the sample S.

(6) Step to Display Image Data (S06 in FIG. 3)

In Step S06, the information processing device 20 displays the image data on the display device 30 according to the display conditions set in Step S15.

As described above, according to the control method of the scanning probe microscope of this embodiment, in the step of setting conditions for acquiring a plurality of pieces of image data (S01 in FIG. 3), the user input work to set a plurality of scanning ranges corresponding to the plurality of pieces of image data respectively is simplified, thus reducing the workload of the user.

In addition, in the process of setting scanning conditions (S11 in FIG. 3), it is configured to limit the spacing between two adjacent scanning ranges to a value greater than or equal to the standard particle size of the powder sample. Therefore, it is possible to prevent overlapping observation of the same particle in the two adjacent scanning ranges. This allows the number of particles present in each field of view to be accurately calculated.

Further, in the step of setting the image data acquisition order (S12 in FIG. 3), by setting the acquisition order of a plurality of pieces of image data so that the distance that the XY scanner 12*xy* moves to acquire the plurality of pieces of image data continuously is minimized, the amount of movement of the XY scanner by the open loop control can be suppressed to be shifted from the target value. This reduces the effect of moving the observation field of view.

[Aspects]

It would be understood by those skilled in the art that the plurality of exemplary embodiments described above is specific examples of the following aspects.

(Item 1)

A scanning probe microscope according to one aspect comprising:

a probe configured to be arranged to face a surface of a sample;

a scanner configured to move a relative position between the sample and the probe;

a drive unit configured to drive the scanner to scan the surface of the sample for each of a plurality of regions acquired by dividing an observation target region of the sample into the plurality of regions;

a data processing unit configured to acquire a plurality of pieces of image data corresponding to the plurality of regions, respectively, as observation images of the observation target region; and an input means configured to accept a user input regarding a condition for acquiring the plurality of pieces of image data, wherein the data processing unit is configured to set the condition based on the user input, the condition including a scanning condition of the scanner, and wherein when the input means accepts the user input for any two variables out of three variables consisting of a scanning range of the scanner for each image data, a spacing between two adjacent scanning ranges, and a maximum number of fields of view capable of being obtained from a maximum scanning range of the scanner, the data processing unit is configured to calculate a remaining one of the three variables based on the accepted two variables.

According to the scanning probe microscope as recited in the above-described Item 1, the user input work to set a plurality of scanning ranges corresponding to a plurality of pieces of image data respectively can be simplified, thus reducing the user workload.

(Item 2)

In the scanning probe microscope as recited in claim 1, the sample is a sample containing powder. The data processing unit sets a lower limit for a variable corresponding to the spacing between the scanning ranges to a standard particle size of the powder.

According to the scanning probe microscope as recited in the above-described Item 2, it is possible to prevent overlapping observation of the same particle in two adjacent scanning ranges. This allows the number of particles present in each field of view to be accurately calculated.

(Item 3)

In the scanning probe microscope as recited in the above-described Item 1, the sample is a sample containing powder. The data processing unit is configured to set the spacing between the scanning ranges to a predetermined value that is greater than or equal to a standard particle size of the powder, and calculate, and calculate, when the user input for any one of the two variables, which are the scanning range and the maximum number of fields of view, is accepted, a remaining one of the two variables based on the accepted one variable.

According to the scanning probe microscope as recited in the above-described Item 3, the user input work to set a plurality of scanning ranges corresponding to a plurality of pieces of image data respectively can be simplified, thus reducing the user workload. Further, the same particle can be prevented from being observed in duplicate in two adjacent scanning ranges, so the number of particles present in each observation field of view can be accurately calculated.

(Item 4)

In the scanning probe microscope as recited in any one of the above-described Items 1 to 3, the data processing unit calculates the number of scanning ranges capable of being arranged with a spacing from each other within the maximum scanning range in a state in which the scanning range is arranged at a center of the maximum scanning range, as the maximum number of fields of view.

According to the scanning probe microscope as recited in the above-described Item 4, within the maximum scanning range, the scanning ranges are evenly distributed in the X-axis and Y-axis directions relative to the center of the maximum scanning range. This makes it possible to observe the observation target region in its entirety by means of a plurality of scanning ranges (observation fields of view).

(Item 5)

In the scanning probe microscope as recited in any one of the above-described Items 1 to 4, upon acceptance of the user input for an acquisition number of image data that is based on the maximum number of fields of view, the data processing unit is configured to set an acquisition order of the image data of the acquisition number. Upon acceptance of the user input that specifies the scanning range of the image data to be acquired first, the data processing unit is configured to set the acquisition order for second and subsequent pieces of image data, based on a position of the scanning range of the first image data.

According to the scanning probe microscope as recited in the above-described Item 5, the user input work to set the acquisition order of the plurality of pieces of image data can be simplified, thus reducing the user workload. Further, when observing a plurality of samples, by specifying the scanning range of the first image data to be acquired, it is possible to unify the acquisition order of the image data among the plurality of samples. This allows the observation regions to be unified among a plurality of samples.

(Item 6)

In the scanning probe microscope as recited in the above-described Item 5, when setting the acquisition order of the second and subsequent pieces of image data, the data processing unit sets the acquisition order such that a movement distance of the scanner in a horizontal direction needed to acquire the image data of the acquisition number is minimized.

According to the scanning probe microscope as recited in the above-described Item, it is possible to suppress the deviation of the amount of scanner movement by the open-loop control from the target value, thereby reducing the effect of the movement of the observation field of view.

(Item 7)

A program according to one aspect is a program for acquiring the observation image within the observation target region of the sample using a computer equipped with the data processing unit as recited in any one of the above-described Items 1 to 6.

According to the scanning probe microscope as recited in the above-described Item 7, the user input work to set multiple scanning ranges corresponding to multiple image data respectively can be simplified, thus reducing the user workload.

Note that the embodiments disclosed here should be considered illustrative and not restrictive in all respects. It should be noted that the scope of the invention is indicated by claims and is intended to include all modifications within the meaning and scope of the claims and equivalents.

DESCRIPTION OF REFERENCE SYMBOLS

1: Optical system
2: Cantilever
3: Probe needle
4: Holder
5: Beam splitter
6: Laser light source
7: Reflective mirror
8: Photodetector
10: Observation device
12: Scanner
**12*xy***: XY scanner
12Z: Z scanner
14: Sample holder
15: Substrate
16: XY direction drive unit
18: Z direction drive unit
20: Information processing device
22: Feedback signal generation unit
24: Scanning signal generation unit
26: Data processing unit
28: Storage unit
30: Display device
40: Input device
50, 52, 52A, 54, 56, 58, 60, 70, 72: Tab
100: Scanning probe microscope
160: CPU
162: ROM
164: RAM
166: HDD
168: Communication I/F
170: Display IF
172 Input I/F
R: Scanning range
Rmax: Maximum scanning range
D: Spacing

The invention claimed is:

1. A scanning probe microscope comprising:
a probe configured to be arranged to face a surface of a sample;
a scanner configured to move a relative position between the sample and the probe;
a drive unit configured to drive the scanner to scan the surface of the sample for each of a plurality of regions acquired by dividing an observation target region of the sample into the plurality of regions;
a data processing unit configured to acquire a plurality of pieces of image data corresponding to the plurality of regions, respectively, as observation images of the observation target region; and
an input means configured to accept a user input regarding a condition for acquiring the plurality of pieces of image data,
wherein the data processing unit is configured to set the condition based on the user input, the condition including a scanning condition of the scanner, and
wherein when the input means accepts the user input for any two variables out of three variables consisting of a scanning range of the scanner for each image data, a spacing between two adjacent scanning ranges, and a maximum number of fields of view capable of being obtained from a maximum scanning range of the scanner, the data processing unit is configured to calculate a remaining one of the three variables based on the accepted two variables by executing arithmetic processing using a relation between the three variables.

2. The scanning probe microscope as recited in claim 1,
wherein the sample is a sample containing powder, and
wherein the data processing unit sets a lower limit for a variable corresponding to the spacing between the scanning ranges to a standard particle size of the powder.

3. The scanning probe microscope as recited in claim 1,
wherein the sample is a sample containing powder, and
wherein the data processing unit is configured to set the spacing between the scanning ranges to a predetermined value that is greater than or equal to a standard particle size of the powder, and calculate, when the user input for any one of the two variables, which are the scanning range and the maximum number of fields of view, is accepted, a remaining one of the two variables based on the accepted one variable.

4. The scanning probe microscope as recited in claim 1, wherein the data processing unit calculates a number of scanning ranges capable of being arranged with the spacing from each other within the maximum scanning range in a state in which the scanning range is arranged at a center of the maximum scanning range, as the maximum number of fields of view.

5. The scanning probe microscope as recited in claim 1, wherein upon acceptance of a user input for an acquisition number of image data that is based on the maximum number of fields of view, the data processing unit is configured to set an acquisition order of the image data of the acquisition number, and wherein upon acceptance of the user input that specifies the scanning range of the image data to be acquired first, the data processing unit is configured to set the acquisition order for remaining ones of the plurality of pieces of image data as second and subsequent pieces of image data, based on a position of the scanning range of the image data to be acquired first.

6. The scanning probe microscope as recited in claim 5, wherein when setting the acquisition order for the second and subsequent pieces of image data, the data processing unit sets the acquisition order such that a movement distance of the scanner in a horizontal direction needed to acquire the image data of the acquisition number is minimized.

7. A non-transitory computer readable medium storing a program for acquiring the observation images within the observation target region of the sample using a computer equipped with the data processing unit as recited in claim 1.

* * * * *